United States Patent
McCardle et al.

(10) Patent No.: US 6,239,401 B1
(45) Date of Patent: May 29, 2001

(54) AUTOMATIC CHUCK LOADABLE STUD WELDING TOOL AND MAGAZINE THEREFOR

(75) Inventors: Thomas A. McCardle, Cincinnati; James W. Miser, Jr., Batavia; Mathias Wottreng, Jr., Cincinnati, all of OH (US)

(73) Assignee: Senco Products, Inc., Cincinnati, OH (US)

(*) Notice: Subject to any disclaimer, the term of this patent is extended or adjusted under 35 U.S.C. 154(b) by 0 days.

(21) Appl. No.: 09/300,920

(22) Filed: Apr. 28, 1999

(51) Int. Cl.$^7$ ........................................ B23K 9/20
(52) U.S. Cl. ................................. 219/99; 219/98
(58) Field of Search ............................. 219/98, 99

(56) References Cited

U.S. PATENT DOCUMENTS

| | | | |
|---|---|---|---|
| 3,371,184 | 2/1968 | Napoli | 219/98 |
| 3,706,870 | 12/1972 | Sauder et al. | 219/98 |
| 4,027,136 | 5/1977 | Taylor | 219/98 |
| 4,163,888 | * 8/1979 | Ettinger | 219/98 |
| 4,420,674 | * 12/1983 | Jordan | 219/99 |
| 4,562,329 | * 12/1985 | Minton | 219/98 |
| 4,620,079 | 10/1986 | Allmann et al. | 219/98 |
| 4,821,401 | 4/1989 | Williams | 29/568 |
| 5,384,445 | 1/1995 | Nakagami | 219/98 |
| 5,389,762 | 2/1995 | Schneegans | 219/99 |
| 5,753,883 | * 5/1998 | Remerowski | 219/98 |
| 5,824,987 | 10/1998 | Volk | 219/98 |

FOREIGN PATENT DOCUMENTS

| | | | |
|---|---|---|---|
| 1112 221 | 8/1961 | (DE) | 219/98 |
| 295 18 041 | 5/1996 | (DE) . | |
| 1259217 | 3/1961 | (FR) . | |
| 668402 | 3/1952 | (GB) | 219/98 |
| 57-17389 | 1/1982 | (JP) | 219/98 |
| 733908 | 5/1980 | (SU) | 219/98 |
| WO 92/06814 | 4/1992 | (WO) . | |

* cited by examiner

Primary Examiner—Clifford C. Shaw
(74) Attorney, Agent, or Firm—Wood, Herron & Evans, L.L.P.

(57) ABSTRACT

A conventional stud welding tool is substantially improved by providing the tool with an electrode with an adjustable aperture capable of grasping studs with a variety of sizes. The adjustable aperture is in the form of a chuck having a plurality of sliding fingers movable along intersecting axes and positionable along these axes to form an aperture of a desired diameter. The fingers have a threaded exterior surface, and the chuck includes a wheel having a threaded interior surface for engaging the threaded exterior surfaces of the fingers for moving the fingers along their axes in response to rotation of the wheel. The chuck is automatically closed and opened by a control circuit in response to the condition of a variety of sensors connected to the control circuit. Also, a collating strip of studs and a feed assembly is used to automatically deliver studs to the electrode under control of the control circuit.

52 Claims, 12 Drawing Sheets

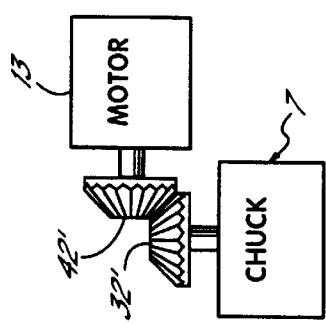
FIG. 7A
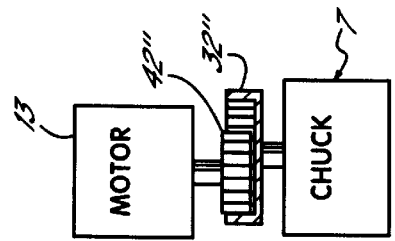
FIG. 7B
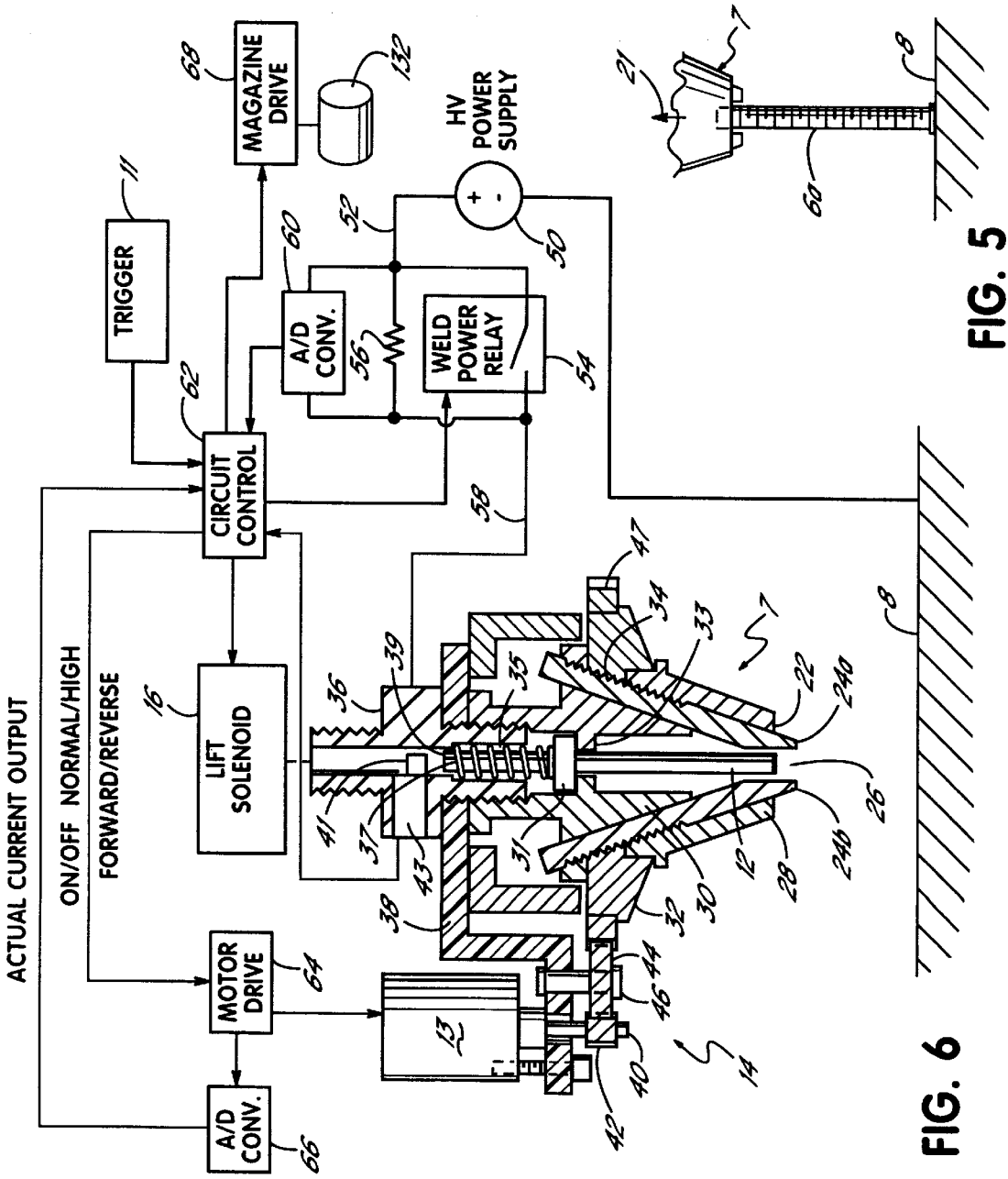
FIG. 5
FIG. 6

AUTOMATIC CHUCK LOADABLE STUD WELDING TOOL AND MAGAZINE THEREFOR

FIELD OF THE INVENTION

The present invention relates to stud welding, and more particularly to a chuck electrode for automatically capturing studs fed to a stud welding tool.

BACKGROUND OF THE INVENTION

The art of stud welding, is well known. The present invention is directed to that part of the stud welding art employing a manual stud welding tool. Prior art workers have devised a number of different types of stud welding tools, all of which operate in substantially the same manner. The tool operator manually mounts an individual stud on the electrode of the tool, which is typically in the form of a cylindrical collet for holding a stud. The operator then causes the tool to press the free end of the stud against the workpiece surface at the position to which the stud is to be mounted. Electrical current is imparted to the stud which is slightly raised from the workpiece to initiate an arc. The free end surface of the stud and the adjacent surface area of the workpiece are rendered molten by the arc. The molten end of the stud is pressed against the molten surface of the workpiece to weld the stud to the workpiece, and the electrical current is turned off. The tool is then manually pulled off of the stud and is ready to receive a new stud.

The prior art tools are characterized by the fact that each stud to be welded to the workpiece must be individually and manually engaged with the tool electrode. This requires a considerable amount of manipulation and inconvenience, and increases the time required to weld each stud. Furthermore, a given tool may be used with studs of multiple different diameters, but in a typical tool, to use a different diameter stud the electrode of the tool must be removed and replaced with an appropriately sized electrode to hold the new stud diameter.

SUMMARY OF THE INVENTION

In accordance with the present invention, the operation of a conventional stud welding tool is substantially improved by providing the tool with an electrode with an adjustable aperture capable of grasping studs with a variety of sizes.

In the disclosed particular embodiment, the adjustable aperture is in the form of a chuck having a plurality of sliding fingers movable along intersecting axes and positionable along these axes to form an aperture of a desired diameter. In this embodiment, the fingers have a threaded exterior surface, and the chuck includes a wheel having a threaded interior surface for engaging the threaded exterior surfaces of the fingers for moving the fingers along their axes in response to rotation of the wheel.

In the particular embodiment, the chuck wheel has a circular threaded surface to permit driven rotation of the chuck wheel. This threaded surface may be located at an outer periphery of the chuck wheel or along an interior surface of the chuck wheel. A chuck drive motor having an output shaft and a pinion that rotates with the output shaft, is coupled to the threaded surface of the chuck wheel for driving the chuck to an open or closed position. The drive motor pinion may be coupled directly to the threaded surface of the chuck wheel, or coupled indirectly to the threaded surface of the chuck wheel via a transmission of one or more idler gears. Also, the axis of the output shaft of the drive motor may be parallel to the axis of the chuck, or orthogonal to it (in which case bevel gears are used to couple the drive motor pinion to the chuck wheel), or at another relative angular position.

In this particular embodiment, the chuck is automatically driven to open or closed positions by a control circuit. The control circuit is response to a sensor detecting positioning of a stud at a proper location inside of the chuck, to close the chuck. The control circuit is further responsive to detection of a completed weld process, to open the chuck. A manual override to open the chuck may also be provided.

In the disclosed particular embodiment, the tool includes a vertical drive motor for lifting the adjustable aperture electrode of the tool and a stud held therein as part of the welding operation. A solenoid is used as the vertical drive motor. The control circuit controls the solenoid to perform a lifting operation as part of stud welding. The control circuit is responsive to a trigger on the tool, and the existence of an electrical connection between the stud and a workpiece, to initiate and control the vertical drive motor during a welding operation.

In the disclosed specific embodiment the tool is provided with a stud supporting and collating strip assembly made of two identical pieces of a collating strip, to feed studs to the electrode of the tool for engagement by the adjustable chuck. A unique drive assembly is utilized for shifting each stud, in sequence, to its proper position with respect to the tool to be welded to the workpiece. That part of the support and collating-strip assembly from which studs have been welded and removed will simply part and bend out of the way during subsequent welding operations. When all of the studs of the strip assembly have been welded, the rearwardmost position of the strip assembly may be removed from the tool and the strip assembly may be discarded.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 5 is a partial view of the electrode assembly of the tool of FIGS. 1–4 being released from a stud after welding;

FIG. 6 is a diagrammatic illustration of the electrode assembly of the tool of FIGS. 1–4 and the electrical circuitry contained within the tool 1;

FIGS. 7A and 7B are diagrammatic illustrations of alterative approaches to engaging the chuck drive motor and chuck of the tool of FIGS. 1–4;

DETAILED DESCRIPTION OF SPECIFIC EMBODIMENTS

Figure 1:
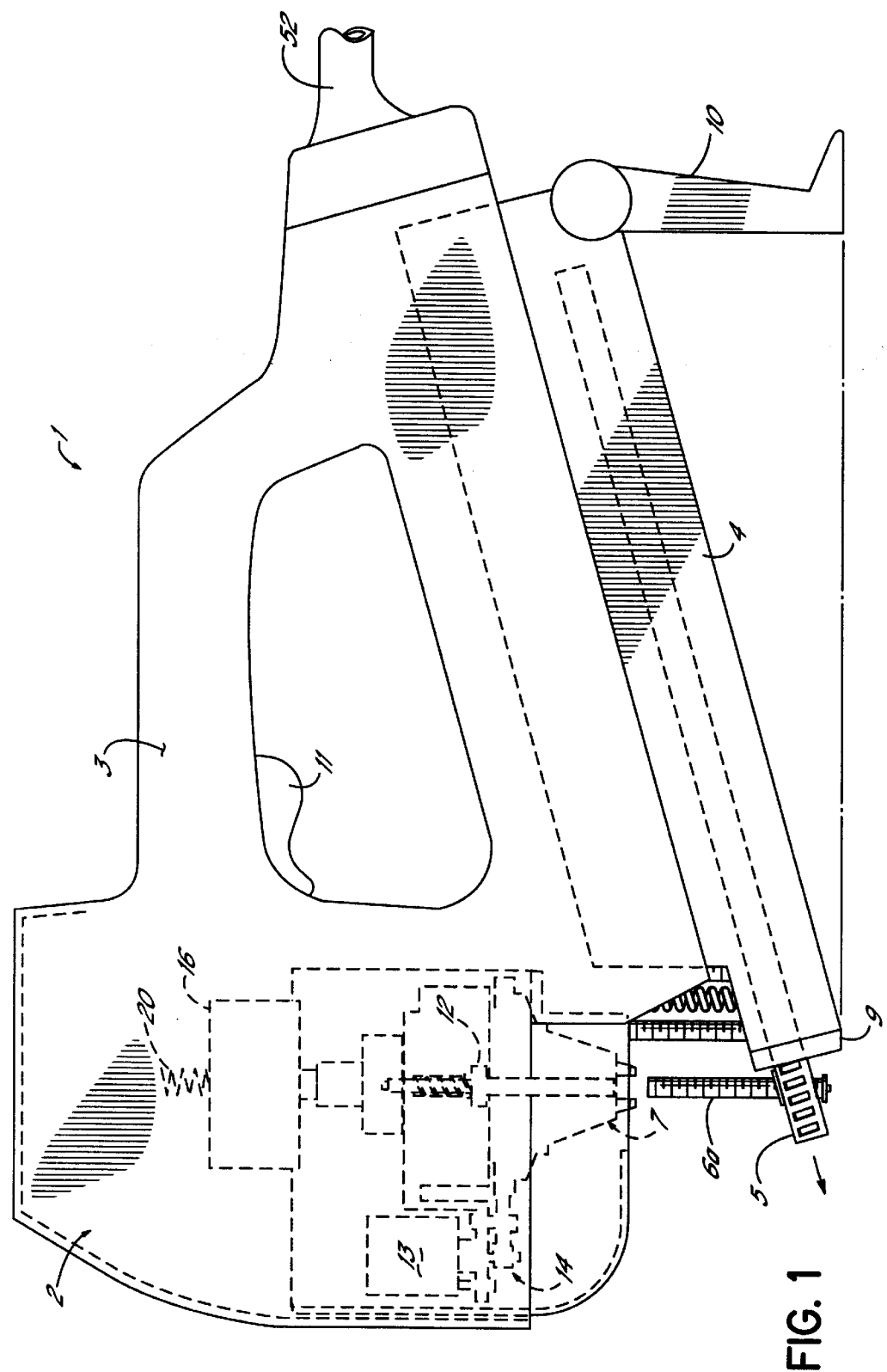
FIGS. 1–4 are side elevational views of the stud welding tool in accordance with principles of the present invention in various positions illustrating use of the tool.

For purposes of this description and in the claims, the front, rear, left side and right side, top and bottom of the tool are based upon the drawings and the operator's view of the tool when manually held by the operator in the position shown in FIG. 1. It will be understood that the tool can be held in any orientation during use, depending on the orientation of the workpiece to which the studs are to be welded.

Reference is first made to FIG. 1 in which an exemplary stud welding tool, incorporating the novel adjustable aperture electrode, magazine and stud feed system of the present invention, is illustrated. The tool is generally indicated at I and has a forward main body portion 2, and a handle portion, 3. The magazine is shown at 4, and is slidably mounted within the main body portion 2 of the tool 1. The stud mounting, and collating strip assembly is shown at 5 with the forwardmost stud indicated at 6(a). The tool 1 is provided with an adjustable aperture electrode 7 which is adapted to clamp the forwardmost stud 6(a) and to shift the stud toward a surface of a workpiece 8 (see FIGS. 2–6) in a manner similar to that described above with respect to the tools of the prior art. The magazine 4 is provided with a forward surface 9 which may be caused to engage the workpiece 8 to stabilize the tool. Pivotally affixed to the rearward end of the tool there is a flip down stabilizer 10 which is shiftable between a retracted position (not shown) and extended position (shown).

While the magazine 4 may be configured to extend parallel to work surface 8 for some applications, the embodiment illustrated is configured to extend rearwardly and upwardly at an angle of about 15°, as shown in FIG. 1. This enables the magazine 4 to clear a previously welded stud or other obstruction.

The tool is provided with an actuating trigger 11, and is completed by an appropriate cable connection 52 (fragmentarily shown in FIG. 1) to a source of electrical current (see FIG. 6).

Within the housing of tool 1, shown in shadow in FIG. 1, is an adjustable aperture electrode assembly 7. As seen in detail in FIG. 6 (see below), this assembly comprises an automatic chuck for closing about a stud and making electrical contact therewith. Within this assembly is a limit switch extender 12 for actuating a limit switch within the automatic chuck. Motor 13 drives the chuck, through a drive train 14, to open and closed positions under control of a control circuit (see FIG. 6). A solenoid 16 coupled to the interior end of assembly 7 is configured to raise and lower assembly 7 relative to the main body portion 2 of the tool 1 as part of a welding operation.

Figure 2:
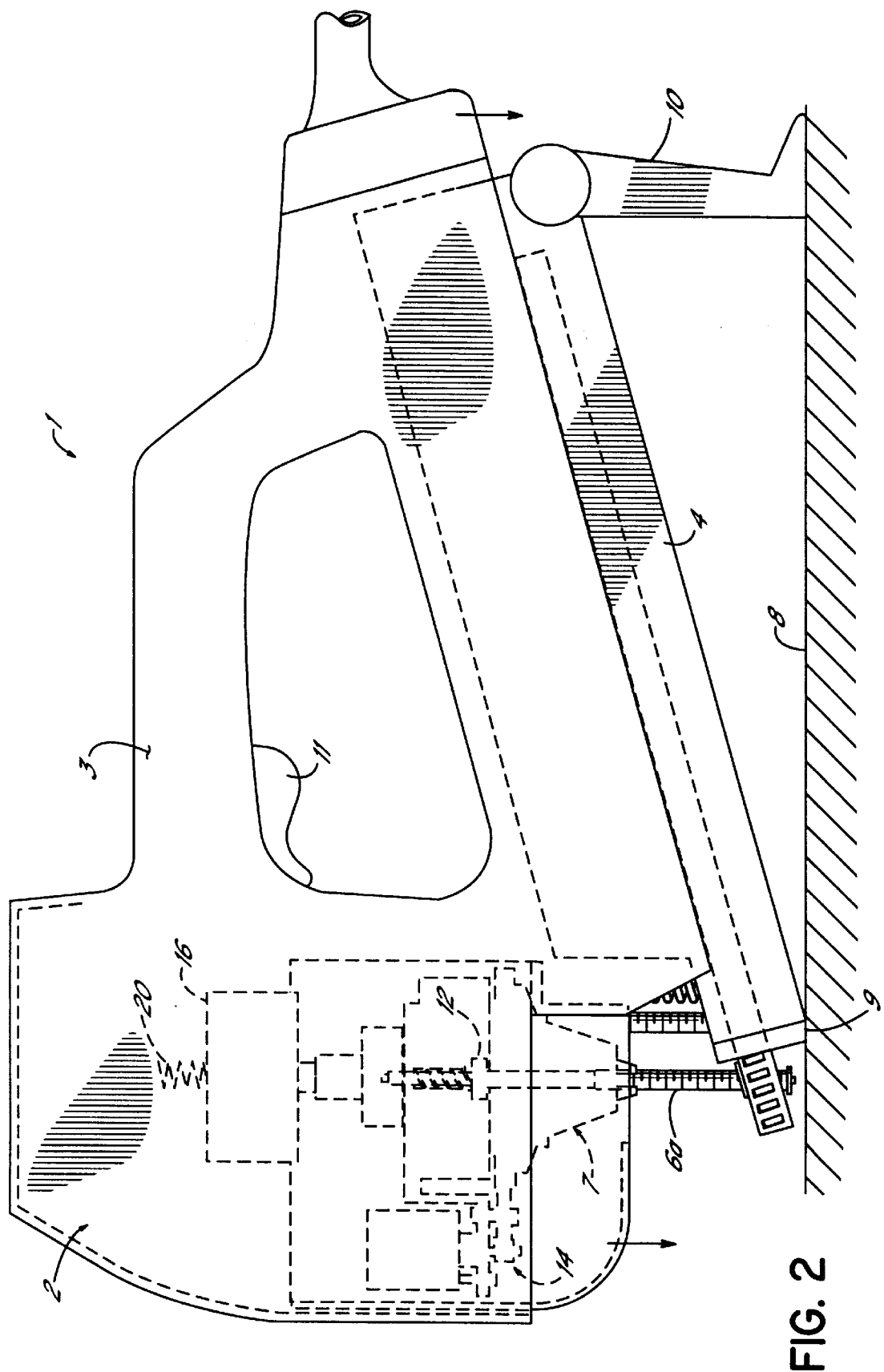

FIG. 1 illustrates the relative locations of magazine 4, forwardmost stud 6a, and electrode assembly 7 prior to engaging tool 1 with a workpiece surface for welding. Referring now to FIG. 2, when tool 1 is initially engaged with a workpiece surface, forward surface 9 of magazine 4 is contacted to the workpiece surface, causing magazine 4 to slide inward relative to main body portion 2, against the opposing force of a biasing spring (not shown) in main body portion 2. As shown in FIG. 2, magazine 4 has moved inward a sufficient distance for the forwardmost stud 6a to contact limit switch extender 12 and move limit switch extender 12 inwardly. As seen below with reference to FIG. 6, this causes extender 12 to actuate a limit switch, in response to which motor 13 is energized to drive the chuck in electrode assembly 7 to clamp about the stud as shown in FIG. 2.

Figure 3:
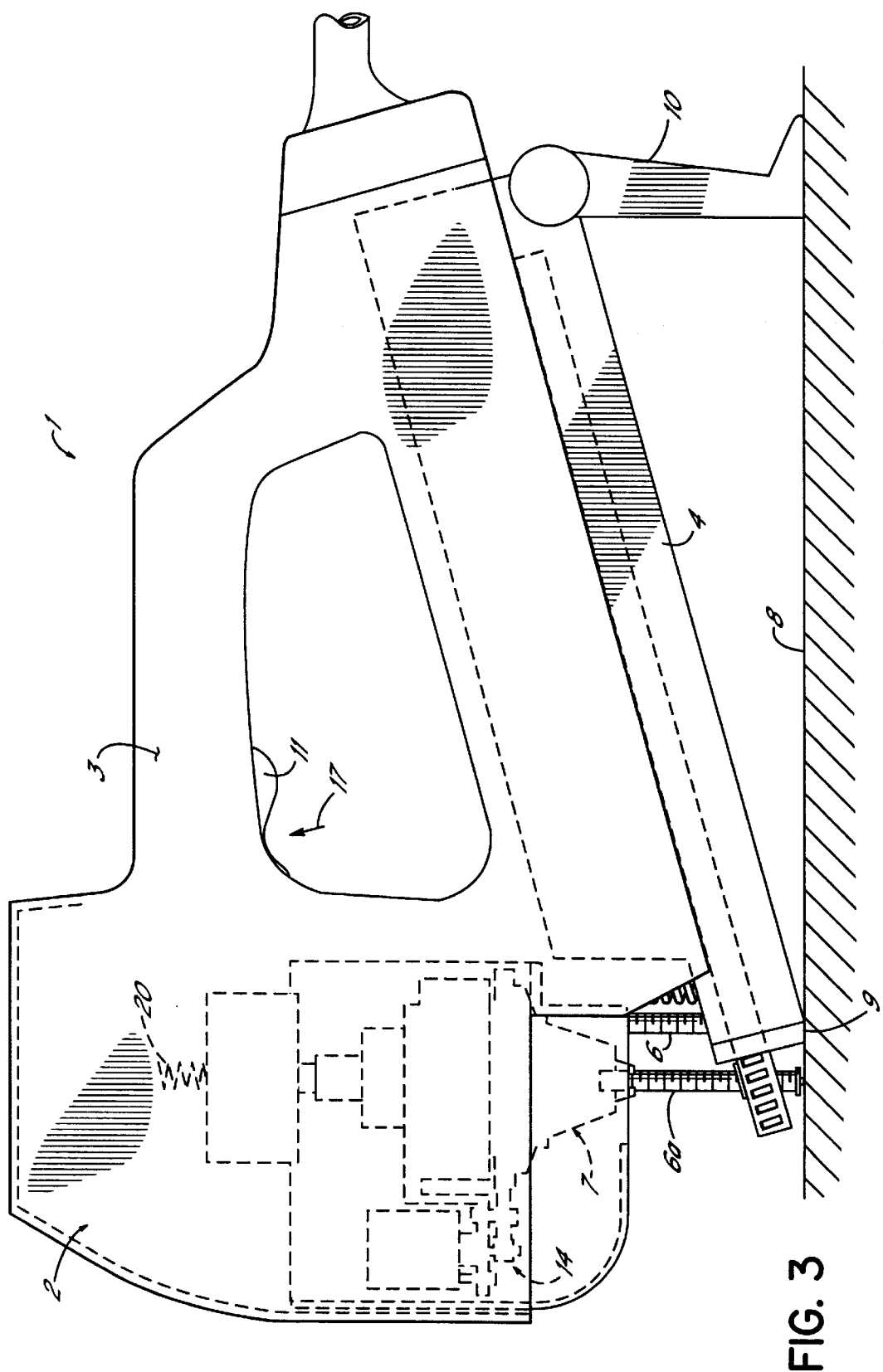

In the position of the tool illustrated in FIG. 2, the forwardmost stud 6a has not yet contacted the work surface 8. Referring now to FIG. 3, further downward movement of the main body portion 2 of tool 1 past the position shown in FIG. 2, forces simultaneous downward movement of the forwardmost stud 6a. In response to this movement, collating strip 5 is deflected to permit forwardmost stud 6a to contact work surface 8, permitting a welding operation to be performed in response to depression of trigger 11 as shown by arrow 17.

Figure 4:
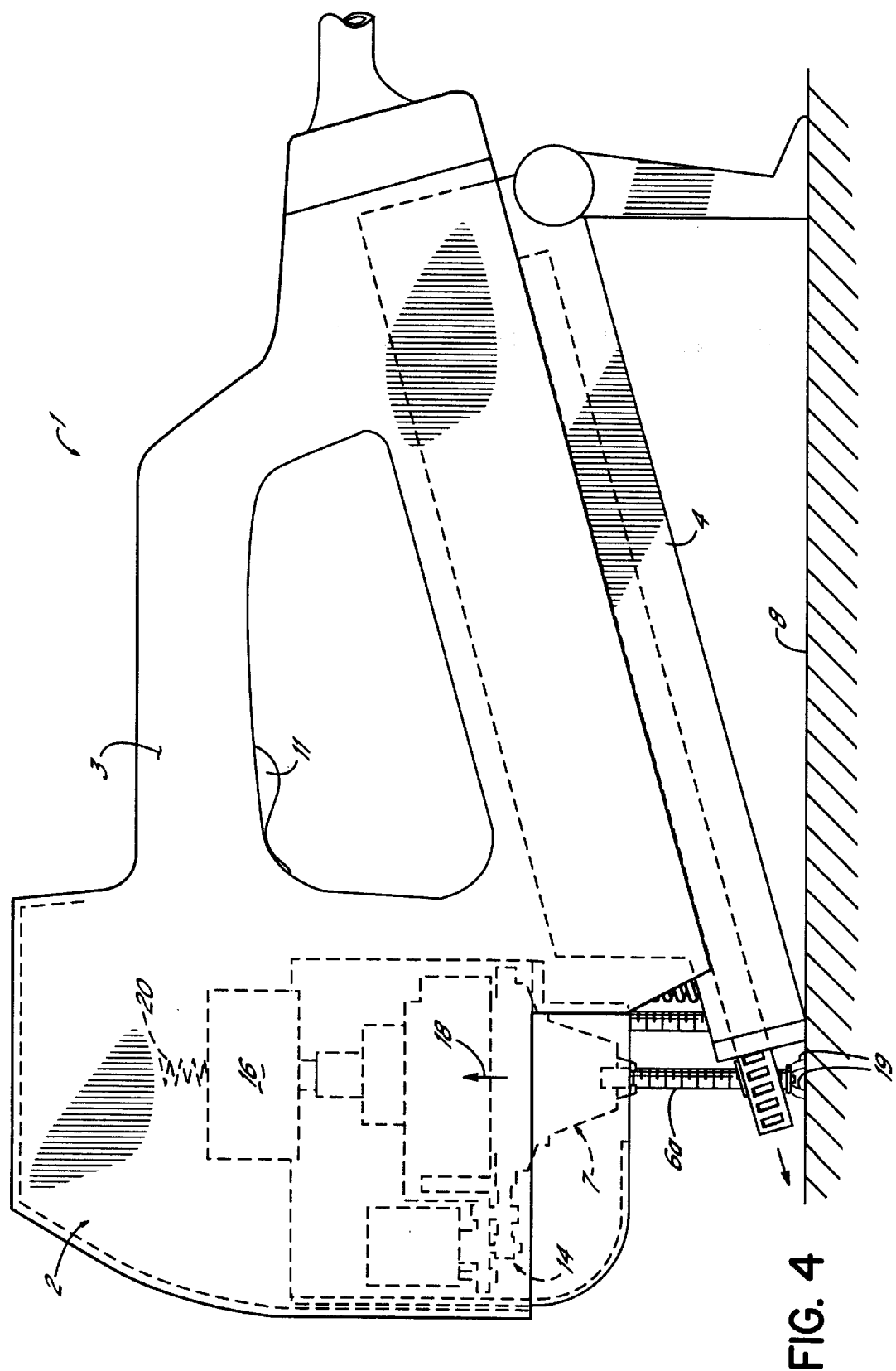

Referring now to FIG. 4, during the welding operation, solenoid 16 is activated, lifting electrode assembly 7 upward in the direction of arrow 18 into the main body portion 2 of tool 1, producing an electrical arc 19 as is known in the art of stud welding. The actuator of solenoid 16 is biased by a return spring 20 so that when solenoid 16 is deactivated, assembly 7 is returned to the position shown in FIGS. 1–2 and the stud is accordingly driven into the molten pool created by arc 19. The result, as shown in FIG. 5, is that forwardmost stud 6a is solidly welded to the work surface 8. At this point, as also seen in FIG. 5, motor 13 is energized to drive the chuck in electrode assembly 7 to release the stud from electrode assembly 7. The tool 1 may then be lifted away from the welded stud in the direction of arrow Referring now to FIG. 6, details of the electrode assembly 7 and the control circuitry can be explained. The adjustable electrode 7 is, in the specific disclosed embodiment, in the form of a chuck 22 similar to that used on hand drills. Specifically, chuck 22 includes a plurality, e.g., three or four, sliding fingers 24a, 24b which mate together to grasp a stud positioned within the opening 26 between fingers 24. Fingers 24 slide respective annular, conical apertures formed between by single metal housing having an exterior portion 28 and an interior portion 30. The exterior surfaces of fingers 24 are threaded at the upper ends thereof. A chuck wheel 32 having a threaded interior surface 34 is engaged to the threaded surfaces of fingers 24 such that rotation of chuck wheel 32 about the axis of the chuck 22 causes fingers 24 to move inwardly or outwardly to close about or release a stud positioned within the opening 26.

Interior portion 30 of the chuck housing is coupled at its upper end to a metal (e.g., brass) connector 36, holding the chuck housing in place on a superstructure 38 made of plastic, ceramic, or another nonconductive material providing electrical insulation. Superstructure 38 is mounted for vertical sliding motion within main body 2 of tool 1 such that the chuck is electrically isolated from tool 1.

Chuck drive motor 13 is also mounted on superstructure 38. The output shaft 40 of motor 13 carries a drive pinion 42. Pinion 42 is in meshing engagement with an idler gear 44 journalled on a shaft 46 mounted to superstructure 38. Idler gear 44 is in further meshing engagement with a toothed surface 47 on an outer periphery of chuck wheel 32. Pinion 42 and/or idler gear 44 are of plastic or another insulating material, so that electrical insulation between motor 13 and the chuck is maintained.

Solenoid 16, shown diagrammatically in FIG. 6, is mounted to the main body portion 2 of tool 1. The actuator of solenoid 16 is coupled to connector 36 such that connector 36, superstructure 38, and all of the components mounted to superstructure 38, move in unison with the actuator of solenoid 16. A return spring 20 (see FIG. 4) is positioned to drive connector 36 and superstructure 38 downward as viewed in FIG. 6 in the absence of actuation by solenoid 16.

Interior to the chuck is a limit switch extender 12 positioned between connector 36 and the interior 30 of the chuck housing. A flange 31 on extender 12 is captured between a feature 33 on interior 30 of the chuck housing and a lower surface of connector 36. The lower surface of connector 36 includes a cavity 35 into which a spring 37 is positioned, biasing extender 12 downward into the opening 26 of the chuck. An interior end 39 of extender 12 is positioned adjacent to the actuator 41 of a limit switch 43 mounted within connector 36, such that when extender 12 is pressed into the chuck by a stud that is being inserted into opening 26, the interior end 39 of extender 12 engages the actuator 41 of limit switch 43. Extender 12 can be moved into the chuck a limited distance until flange 31 engages a lower surface of connector 36, at which point extender 12 will cease motion. This establishes a reference position for a stud that is pressed into opening 26, since a stud cannot be inserted any further into chuck after the stud has moved extender 12 to the point that flange 31 engages the lower surface of connector 36.

FIG. 6 further illustrates electrical components of tool 1. A high voltage power supply 50 is connected to the tool through cabling 52. Within the tool, cabling 52 connects to a parallel connected relay 54 and sense resistor 56, the opposite sides of which are connected by further high voltage cabling to connector 36. As discussed above, connector 36 is electrically connected to the chuck of electrode assembly 7 and thus weld current may be delivered from power supply 50 through cabling 52 and 58 to a stud engaged to the electrode assembly 7. An analog to digital (A/D) converter 60 coupled across sense resistor 56 detects the voltage drop across sense resistor to determine whether electrical contact has been made through a stud to the work surface, for the purpose of activating the welding process as described below.

A control circuit 62 within tool 1 is responsive to signals from A/D converter 60 to generate a control signal for relay 54 during the welding process. Control circuit 62 is further connected to solenoid 16 to actuate solenoid to lift electrode assembly 7 during a weld operation.

Control circuit 62 is also connected to a motor drive circuit 64 providing electrical drive signals to chuck motor 13. A current sense output of motor drive circuit 64 is coupled to an A/D converter 66, so that A/D converter 66 produces an output signal representative of the current in the windings of chuck motor 13. The output of A/D converter 66 is delivered to control circuit 62 for use in controlling operation of the motor 13 as described below.

Figure 13:
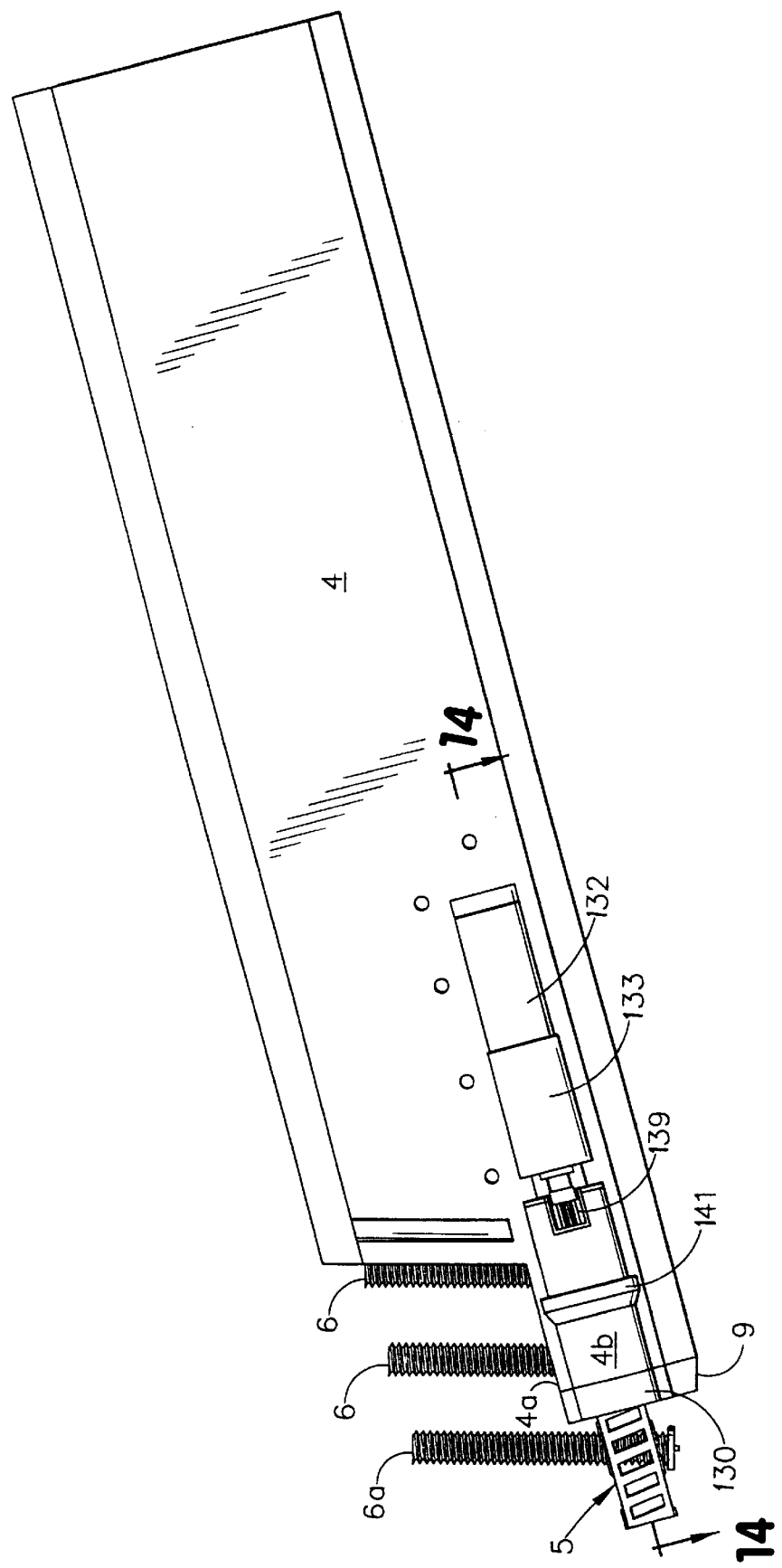
FIG. 13 is a left side elevational view of the magazine of FIG. 4 with the motor and gear box cover removed.

Control circuit 62 is also connected to trigger switch 11 to detect actuation and deactuation of trigger 11. Control circuit 62 is also connected to limit switch 43 to detect insertion of a stud into the chuck (as detected by motion of the interior end 39 of extender 12 into engagement with the actuator 41 of the limit switch 43. Finally, control circuit 62 is connected to a magazine drive circuit 68 for controlling the magazine drive motor 132 (see FIG. 13).

Figure 15:
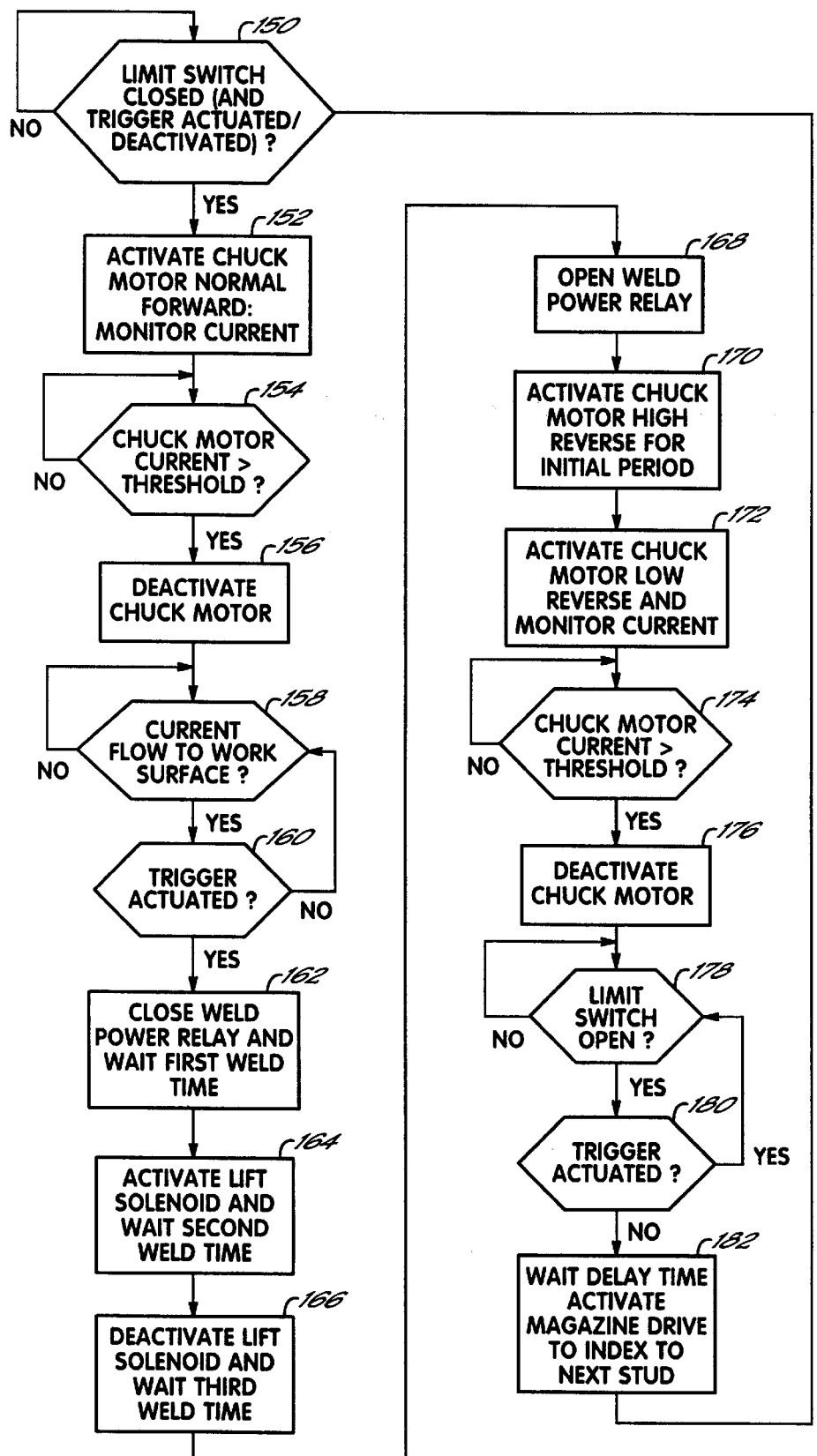
FIG. 15 is a flow chart of operations performed by control circuit in operation of the tool described by the preceding figures.

Details on the operation of control circuit 62 will be further understood from the discussion provided below with reference to FIG. 15.

Referring now to FIGS. 7A and 7B, alternative approaches to engaging motor 13 to chuck wheel 32 are illustrated. While in FIG. 6, the axes of motor 13 and the chuck are parallel, this need not be the case. As seen in FIG. 7A, motor 13 may be mounted with its axis non-parallel to that of the chuck. In this case, bevel gears may be used on motor pinion 42' and on chuck wheel 32'. In FIG. 7A, the axis of motor 13 is perpendicular to the axis of the chuck, but other angles may also be formed with suitable bevel gears. As seen in FIG. 7B, motor 13 may be mounted with its axis inside of the periphery of the chuck wheel. In this situation, chuck wheel 32" has an interior toothed surface for engaging to the pinion 42" of motor 13. These alternative embodiments may be useful where it is desired to reduce the width of the main body portion 2 of the tool 1 perpendicular to the axis of the chuck, e.g. to permit manipulation of the tool into tight spaces.

Figure 8:
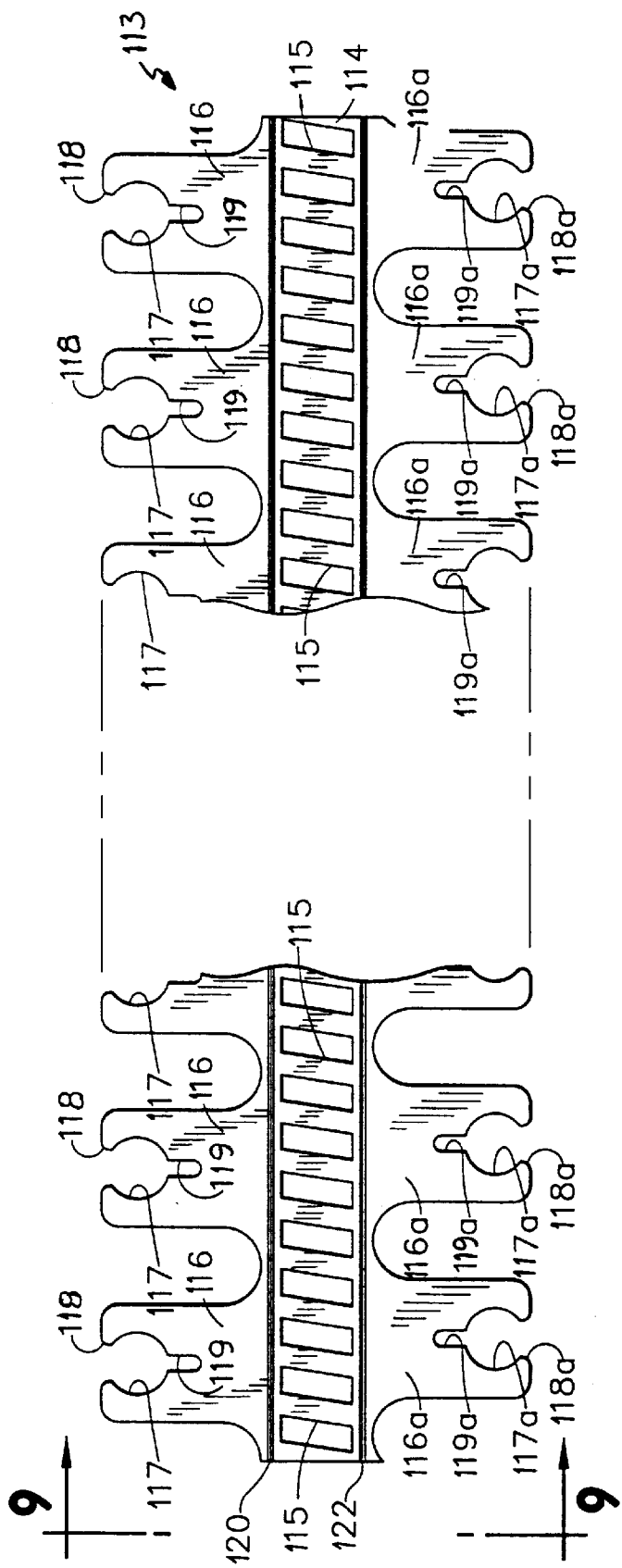
FIG. 8 is a fragmentary plan view of a collating strip used with the stud welding tool of FIGS. 1–4.

Reference is now made to FIG. 8 which illustrates a collating strip 113 from which the strip assembly 5 is made. The strip 113 has a central longitudinal band portion 114 with a plurality of slots 115 formed therein in parallel spaced relationship. The purpose of slots 115 will be apparent hereinafter.

To one side of central band 114, the strip 113 has a plurality of laterally extending, identical tabs 116. Each tab 116 has a circular perforation 117, the purpose of winch will be apparent hereinafter. It will be noted that each perforation 117 intersects the outermost edge of its respective tab creating an opening 118 having a width less than the diameter of circular perforation 117. Again, the purpose of opening 118 will be apparent hereinafter. It will further be noted that each tab 116 is provided with a short slot 119 which extends radially from the circular opening 117 and which is located diametrically opposite opening 118. Once again, the purpose of slot 119 will be apparent hereinafter.

The strip 113 has a second set of tabs extending laterally from central band 114 in the direction opposite that of tabs 116. These additional tabs are identical to tabs 116 and are indicated at 116(*a*). Each tab 116(*a*) has a circular perforation identical to a circular perforation 117 and indicated at 117(*a*). Each tab has an opening equivalent to opening 118, indicated at 118(*a*) and a slot equivalent to slot 119 indicated at 119(*a*).

It will be noted, however, that the tabs 116 and the tabs 116(*a*), while identical in configuration, are slightly offset longitudinally. This is dictated by the desire to provide the magazine 4 with an upwardly and rearwardly directed angularity with respect to the workpiece 8 (see FIG. 1). If tool 1 were so configured that the magazine is parallel to workpiece 8, then the tabs 116 and 116*a* would not be offset from each other, but rather would be directly opposite each other.

Figure 9:
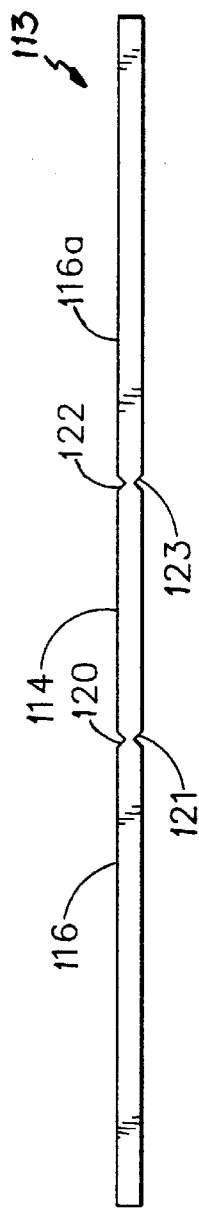
FIG. 9 is an end view of the collating strip of FIG. 8.

Reference is now made to FIG. 9 which is an end view of strip 113 of FIG. 8, as seen from the line 10—10 of FIG. 8. It will noted that the central band 114 is separated from the tabs 116 by a pair of scorelines 120 and 121 located to either side of the strip. Similarly, the central band is separated from the tabs at 116(*a*) by score lines 122 and 123 located to either side of the strip. The score lines 120–123 enable the tabs 116 and 116(*a*) to be bent to either side of central band 114, as will be apparent hereinafter.

The strip 113 may be molded of high-density polyethylene or the equivalent. While not intended as a limitation, a nominal thickness of 0.031 inch has been found satisfactory. The strip 113 may be of considerable length and may be coiled for shipping and storage. In an exemplary embodiment, the strip had a length of 500 meters.

Figure 10:
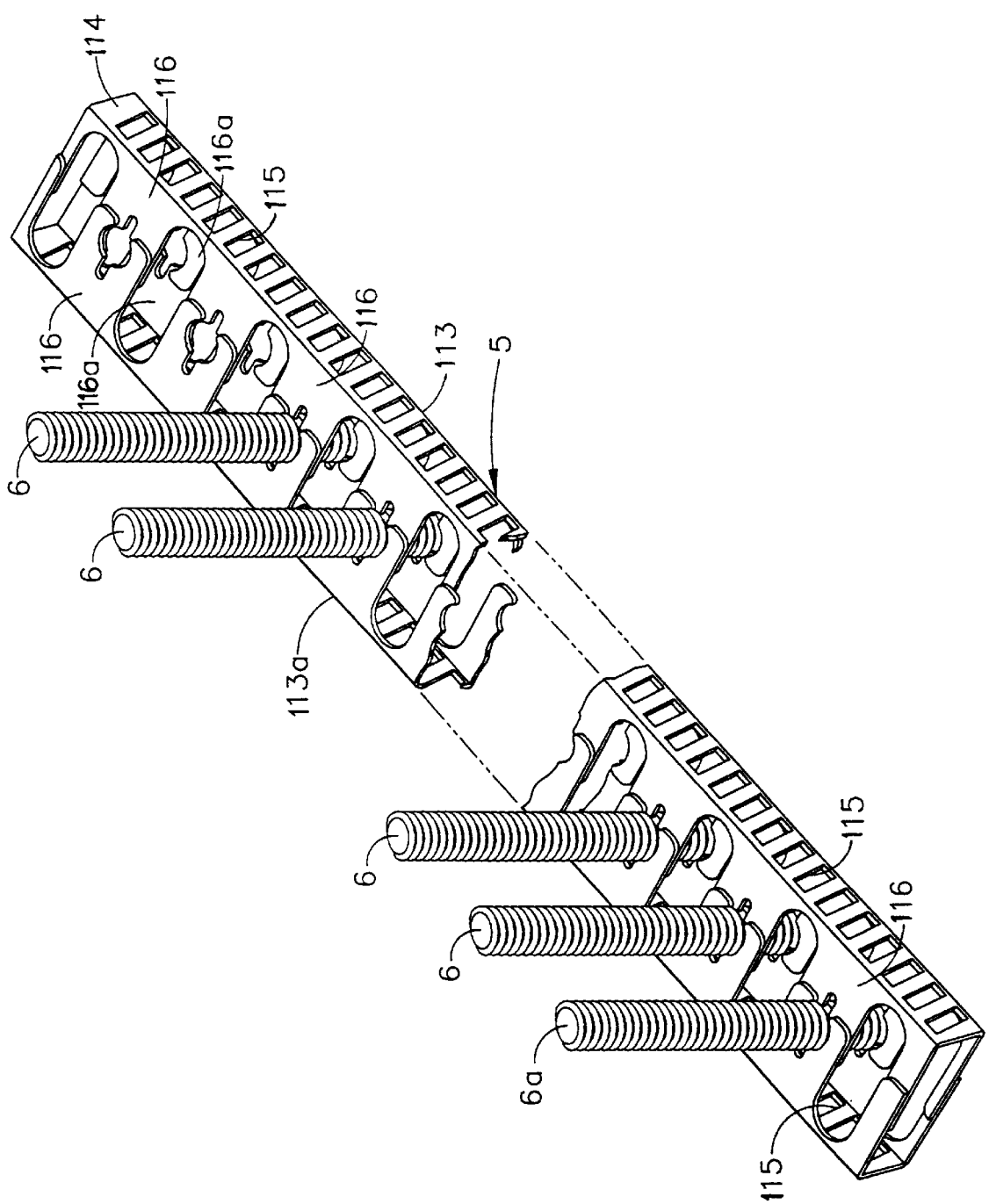
FIG. 10 is a fragmentary top, front and left side perspective view of the collating strip assembly of FIGS. 8–9, including a plurality of studs.

Reference is now made to FIG. 10 wherein the strip assembly 5, mounting and collating a row of studs, is fragmentarily illustrated. This assembly is made in the following manner. A first strip is cut to length from the strip coil. A first strip 113 (see FIG. 8) has its tabs 116 and 116(*a*) folded into the paper (as viewed in FIG. 8) to form a U-shaped structure, the central band 114 comprising the base of the U-shaped structure and the tabs 116 and 116(*a*) forming the legs of the U-shaped structure. With the strip 113 in this configuration each stud is simultaneously shoved into the perforations 117 and 117*a* (see FIG. 8) of a corresponding pair of tabs 116 and 116*a* via their respective openings 118 and 118*a*. The slots 119 and 119*a* help their respective openings 118 and 118*a* enlarge enough to allow the stud to enter their respective perforations 117 and 117*a*. As shown is FIGS. 1 and 13, the offset of each cooperating pair of tabs 116 and 116*a* enables each stud to be substantially vertical when the strip assembly 5 lies at an upward and rearward angle of about 15°. Next, a second strip 113*a* identical to strip 113 is removed from the coil and has its tabs folded oppositely (i.e. out of the paper as viewed in FIG. 8) to form a second U-shaped member. The second U-shaped member is located on the other side of studs 6 and 6*a* opposite strip 113. The tabs 116 of strip 113*a* overlap the tabs 116 of strip 113. Similarly, the tabs 116*a* of strip 113*a* underlap the tabs 113*a* of strip 113. The strip 113*a* is caused to shift toward strip 113 so that each stud will slip into the circular perforations 117 and 117*a* via openings 118 and 118*a* of its respective cooperating pair of tabs 116 and 116*a* of strip 113*a*, as shown in FIG. 10. The resulting, structure is the strip assembly 5 which mounts and collates the first stud 6*a* and the remaining studs 6. The strip assembly 5 is substantially rectangular in cross-section which lends to the strip assembly a sufficient rigidity to mount and collate first stud 6*a* and the remaining studs 6. The number of studs supported by strip assembly 5 is not a limitation of the present invention. It has been found that such a strip holding sixteen studs is easy to make, easy to handle and easy to package. It will be noted from FIG. 10 that the last two cooperating pairs of tabs 116 and 116*a* of strips 113 and 113*a* do not carry studs. This part of strip assembly 5 is used to support this strip assembly with respect to the magazine during the welding of the last stud of the row. The slots 119 and 119*a* of the tabs 116 and 116*a* also help the top and bottom of the strip assembly to flex when each stud is shifted axially by the tool electrode during a welding operation.

In some instances it may be preferred to form the strip assembly 5 from two separate coils of the collating strip. In this instance the strip assemblies 5 would be cut to length after assembly.

The strip assembly 5 can mount and collate both threaded and non-threaded studs and studs having a range of lengths from about ¾" to about 2". By proper sizing of the tool and magazine, this range of lengths may be varied.

Figure 11:
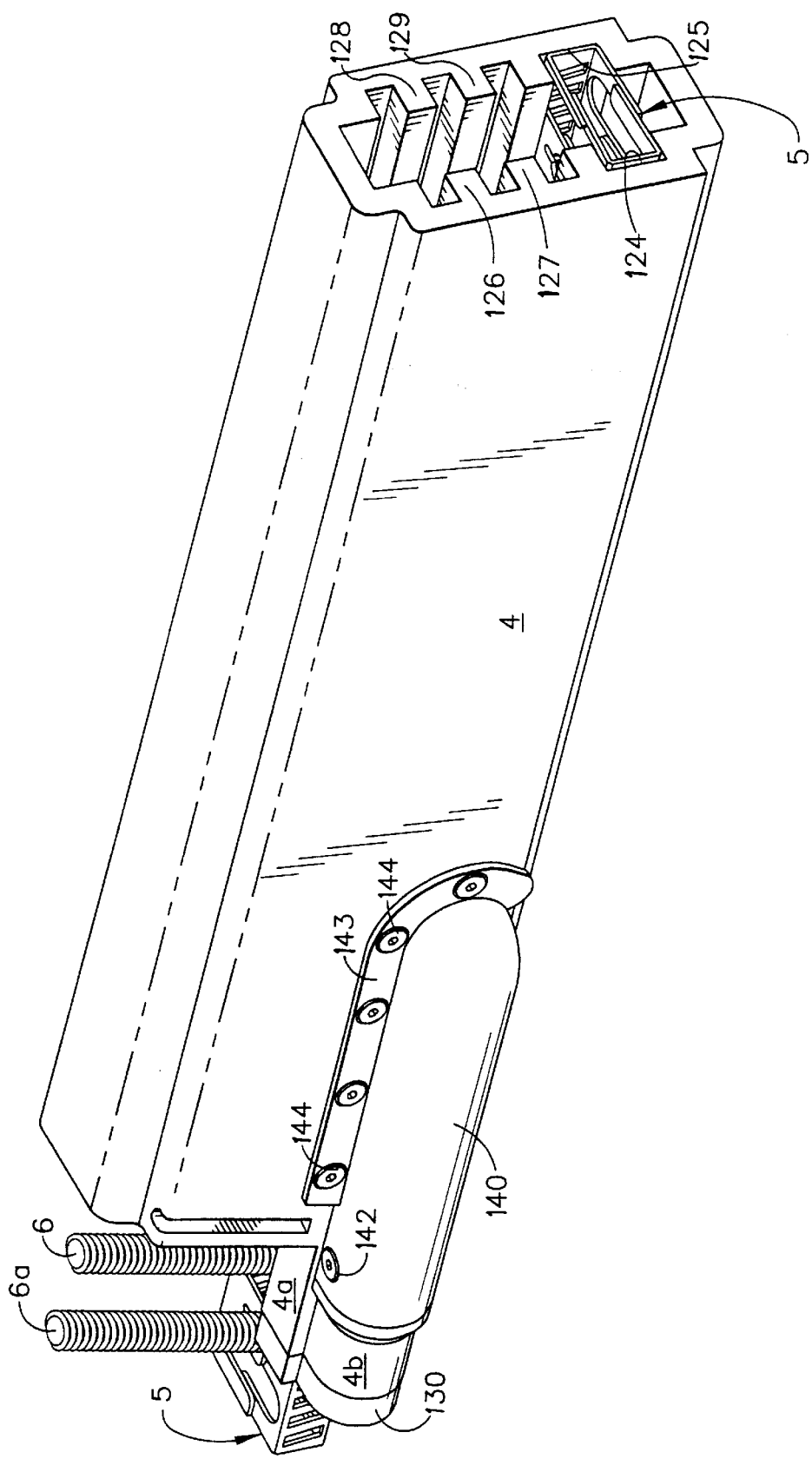
FIG. 11 is a left side, top and rear end perspective view of the magazine of the present invention including the collating strip assembly of FIG. 10.
Figure 12:
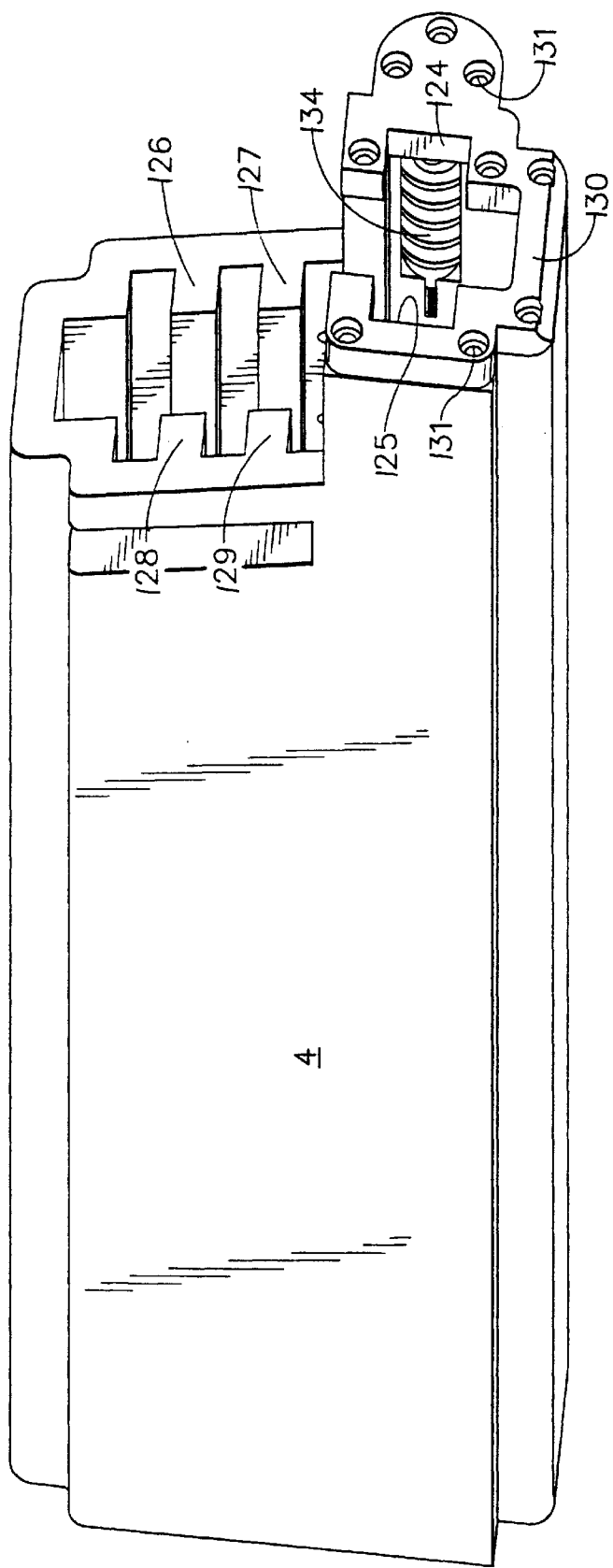
FIG. 12 is a front and right side perspective view of the magazine.

Reference is now made to FIGS. 11, 12, 13 and 14, wherein the magazine 4 and the drive assembly for the stud bearing strip assembly are shown. Turning first to FIGS. 11 and 12. it will be noted that the magazine 4 comprises an elongated hollow member having a pair of opposed, longitudinal slots 124 and 125 adapted to slidingly receive and guide the strip assembly 5. Above slots 124 and 125 magazine 4 contains two opposed pairs of longitudinal, inwardly directed opposed ribs 126, 127, 128 and 129, serving to guide the studs during their passage through the magazine 4.

At the forward end of magazine 4, that part of the magazine which contains grooves 124 and 125 is extended as at 4*a*. The extension 4*a* is an integral, one-piece part of magazine 4. The extension has a semi-cylindrical portion 4*b* which constitutes an integral, one-piece part of the extension. The extension is completed by an end cap 130 affixed to the forwardmost end of extension 4*a* and its semi-cylindrical portion 4*b* by a plurality of machine screws 131. It will be noted that the extension 4*a* and the end cap 130 continue the strip assembly-receiving slots 124 and 125. It would be within the scope of the invention to provide an end cap just for the semi-cylindrical portion 4*b* and the adjacent portion of extension 4*a* to enable removal of gear 134.

Figure 14:
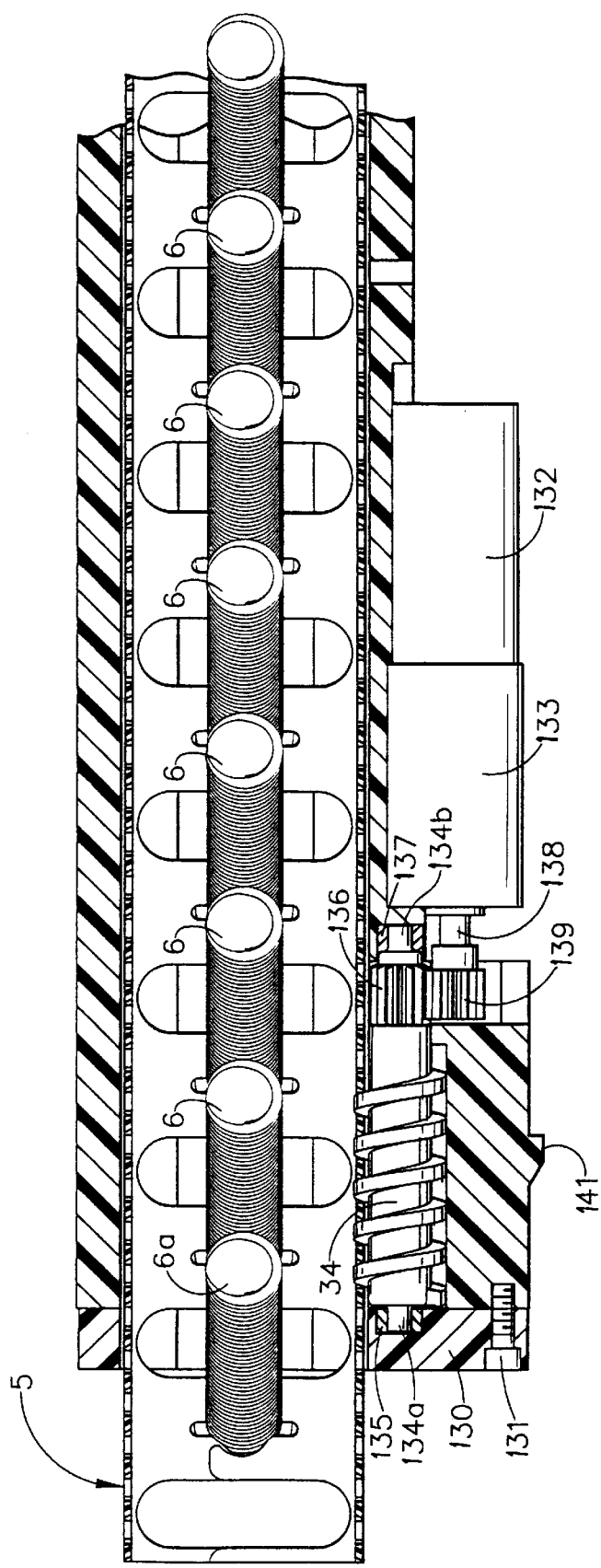
FIG. 14 is longitudinal cross-sectional view taken along section line of 14—14 of FIG. 13.

As is most clearly shown in FIG. 14, the drive assembly for the stud-mounting strip assembly 5 comprises an electric motor 132, a gear train 133 and a worm gear 134. At its forward end, worm gear 134 has a shaft portion 134*a* mounted in an appropriate bearing 135 located in end cap 130. At its other end, the worm gear 134 is provided with a driven gear 136 and an end shaft portion 134*b* mounted in an appropriate bearing 137. It will be noted that the worm gear teeth engage in the slots 115 of the adjacent strip constituting half of the strip assembly 5. It will be apparent from Figs. such as FIGS. 8, 10, and 13 that the parallel spaced slots 115 are formed at an angle to accommodate the pitch of worm gear 134. Other types of gears could be used. For example, a spur gear could be used to drive the stud-bearing strip assembly 5. A worm gear, however, requires a minimum lateral extension on magazine 4.

The motor 132 and the gear train box are located behind and parallel to worm gear 134. Gear box 133 has an output shaft 138 terminating in a drive gear 139 meshed with the drive gear 136 of worm gear 134. Motor 132 and gear train 133 are held in position by a cover member 140. The forward end of cover 140 wraps about a part of the portion 4*b* of extension 4*a*. The portion 4*b* has a flange 141 thereon which is abutted by the forward end of cover 140. The cover 140 is threadedly attached to the portion 4*b* of extension 4*a* by one or more machine screws, one being shown at 142 in FIG. 11. Cover 140 is also provided with a flange 143 which is mounted on the left side of magazine 4 by machine screws 144. It will be understood that the worm gear 134, motor 132 and rear train box could be mounted on the right side of magazine 4. Since the strip assembly 5 is made up of two identical collating strip lengths 113, the slots 115 are present on both longitudinal edges of the strip assembly 5.

The magazine is preferably made of non-conductive material such as nylon, ABS, polyurethane, or the like. The enclosure for motor 132 and gear train 133 may be made of any one of the same materials. End cap 130 is preferably made of nylon.

The invention having been described in detail, its operation can now be set forth with reference to FIG. 15. To initialize the tool, the operator will load a stud-bearing strip assembly 5 into magazine 4 from the rearward end thereof. The operator will shove the strip assembly 5 into the magazine until the forward end of strip assembly 5 contacts the lead in end of worm gear 134. The worm 134 is then energized to advance the stud bearing strip assembly 5 until the forwardmost stud 6*a* is in position to be welded. At this point, worm gear 134 will automatically stop and the stud 6*a* will be positioned to be engaged and clamped by the electrode assembly 7 of tool 1. This moment in time corresponds to step 150 in the operation of control circuit 62 as illustrated FIG. 15.

Thereafter, the operator shoves downwardly on the tool until the forwardmost stud 6*a* enters the chuck, contacts the limit switch extender 12, and moves the limit switch extender 12 inwardly to actuate limit switch 43. When control circuit 62 detects the limit switch is closed (step 150), control circuit 62 sequences to step 152, in which the chuck motor 13 is activated in a normal forward mode, to close fingers 24 of the chuck about the stud 6a. (The condition of the trigger may also be evaluated in step 150; e.g., the trigger may be required to be open or closed before sequencing from step 150 to step 152.) Control circuit 62 also begins monitoring the current in the chuck motor 13 using A/D converter 66. When the chuck has closed about the stud, motor 13 will stall and the motor winding current will dramatically increase. An increase in current above an established threshold is detected in step 154, and when this current increase is detected, control circuit 62 proceeds to step 156 where the chuck motor is deactivated.

At this point, the stud has been secured in the chuck. The operator then continues to press the tool downward to the work surface to the position where the stud is to be welded. Ultimately, as seen in FIG. 3, the stud will contact the work surface. This contact can be detected by a high voltage drop across sense resistor 56 and a small current flow through resistor 56 detected by A/D converter 60. This current flow is detected in step 158. To activate welding, the operator must also actuate the trigger 11 of tool 1. Actuation of the trigger is detected in step 160.

When the trigger is actuated and the stud is positioned against the workpiece, control circuit 62 proceeds to step 162 in which the weld power relay 54 is closed for a first programmed time period. Then, in step 164, the lift solenoid 16 is activated to lift the stud from the work surface for a second programmed time period which is sufficient to initiate an arc so that the adjacent end of the stud and the adjacent portion of the workpiece surface will become molten. Thereafter, in step 166, the solenoid is deactivated and the stud will be shoved against the workpiece while the current continues to flow, to complete the weld. Then, in step 168, relay 54 is opened and the electric current is automatically shut off.

At this point, in step 170, control circuit 62 activates the chuck motor 13 with a brief burst of high reverse current for an initial period, to create a large initial torque to break the chuck fingers 24 away from the stud. After this initial period, in step 172, the chuck motor is operated continuously in a normal reverse mode to fully open the chuck, while the motor 13 current is monitored. As long as a normal operating current is detected, control circuit 62 will remain in step 174. When the chuck is fully open, motor 13 will stall and an above-threshold motor current will be detected in step 174. Control circuit will then proceed to step 176 and deactivate the chuck motor, and then to step 178 to monitor the limit switch.

After a weld is complete and the chuck is opened, the operator will lift the tool away from the workpiece and the welded stud will be disengaged from strip assembly 5. During this operation, the limit switch extender 12 will be moved outwardly and disengage from the limit switch actuator 41. Once the limit switch opens, control circuit will proceed from step 178 to step 180 in which the condition of the trigger 11 is monitored. As long as the trigger is actuated, control circuit 62 will not proceed further.

Once the trigger is released, control circuit 62 will proceed to step 182 in which, after a delay time of perhaps 500 milliseconds, the magazine drive motor 132 is actuated and the next stud of the tandem row, now the first stud of the row, will automatically be shifted together with the strip assembly 5 to the welding position by the worm gear 134, motor 132 and gear train 133. The tool is then ready for the next welding operation, and control circuit 62 returns to step 150.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, it would be possible to provide a left collating strip and a right collating strip with score lines on one side only. It would also be within the scope of the invention to mold otherwise for left and right strips having a U-shaped cross-section. Furthermore, while the teachings of the present invention will be described in terms of stud welding tool, it may be used with weld pins, refractory anchors, knurled pins and the like. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A stud welding tool, comprising
an electrode for electrical connection to a stud to be welded to a workpiece, comprising a plurality of sliding fingers movable along intersecting axes and positionable along said axes to form an aperture therebetween of a desired diameter,
said electrode capable of grasping studs of a plurality of different sizes.

2. The stud welding tool of claim 1 further comprising a housing, said housing at least partially enclosing said electrode and being electrically insulated from said electrode.

3. The stud welding tool of claim 2 wherein said housing defines a handle for manual manipulation of said stud welding tool into position on said workpiece.

4. The stud welding tool of claim 2 further comprising
a connector for connection to a source of high current electricity,
a switch coupled between said source of high current electricity and said electrode for selectively delivering electricity to said electrode,
a trigger, and
a control circuit controlling said switch in response to said trigger.

5. The stud welding tool of claim 1 wherein said electrode comprises a chuck comprising said plurality of sliding fingers.

6. The stud welding tool of claim 5 wherein
said fingers have a threaded exterior surface, and further comprising
a chuck wheel having a threaded interior surface engagable to the threaded exterior surfaces of the fingers, for sliding the fingers in response to rotation of the chuck wheel.

7. The stud welding tool of claim 6 wherein said chuck wheel has a circular threaded surface.

8. The stud welding tool of claim 7 wherein said circular threaded surface of said chuck wheel is located at an outer periphery of said chuck wheel.

9. The stud welding tool of claim 7 wherein said circular threaded surface of said chuck wheel is located at an interior surface of said chuck wheel.

10. The stud welding tool of claim 7 further comprising a chuck drive motor having an output shaft and a pinion that rotates with the output shaft, said pinion being coupled to the threaded surface of said chuck wheel for driving said fingers to an open or closed position.

11. The stud welding tool of claim 10 wherein said drive motor pinion is coupled directly to the threaded surface of the chuck wheel.

12. The stud welding tool of claim 10 wherein said drive motor pinion is coupled indirectly to the threaded surface of the chuck wheel via one or more idler gears.

13. The stud welding tool of claim 10 wherein an axis of rotation of said output shaft of said drive motor is parallel to an axis or rotation of said chuck wheel.

14. The stud welding tool of claim 10 wherein an axis of rotation of said output shaft of said drive motor is orthogonal to an axis of rotation of said chuck wheel.

15. The stud welding tool of claim 14 wherein at least one of said drive motor pinion and said chuck wheel comprise bevel gear teeth.

16. The stud welding tool of claim 10 further comprising a control circuit, said control circuit controlling said chuck drive motor to drive said fingers to an open or closed position.

17. The stud welding tool of claim 16 further comprising a sensor detecting positioning of a stud at a proper location between said fingers, said control circuit being responsive to said sensor to control said chuck drive motor to drive said fingers to an open or closed position.

18. The stud welding tool of claim 17 wherein said control circuit is further responsive to completion of a weld process, to control said chuck drive motor to drive said fingers to an open position.

19. The stud welding tool of claim 10 further comprising a manual override mechanism to drive said fingers to an open position.

20. The stud welding tool of claim 1 further comprising a vertical drive motor for lifting said electrode and a stud held therein as part of the welding operation.

21. The stud welding tool of claim 20 wherein said vertical drive motor comprises a solenoid.

22. The stud welding tool of claim 20 further comprising a control circuit controlling said vertical drive motor to perform a lifting operation as part of stud welding.

23. The stud welding tool of claim 22 further comprising a trigger and a sensor for detecting the existence of an electrical connection between a stud in said electrode and said workpiece, said control circuit initiating and controlling said vertical drive motor during a welding operation in response to actuation of said trigger and detection of an electrical connection by said sensor.

24. The stud welding tool of claim 1 further comprising a stud supporting and collating strip assembly holding a plurality of studs to be engaged by said electrode.

25. The stud welding tool of claim 24 wherein said strip assembly comprises two pieces of a collating strip.

26. A stud welding tool, comprising
an electrode for electrical connection to a stud to be welded to a workpiece,
said electrode having an adjustable aperture capable of grasping studs of a plurality of different sizes,
a stud supporting and collating strip assembly holding a plurality of studs to be engaged by said electrode, and
a drive assembly, said strip assembly being held by said drive assembly, said drive assembly shifting each stud in said strip assembly, in sequence, to a position to be engaged by said electrode.

27. A method of welding studs, comprising
providing an electrode for electrical connection to a stud to be welded to a workpiece, comprising a plurality of sliding fingers movable along intersecting axes and positionable along said axes to form an aperture therebetween of a desired diameter,
adjusting said aperture of said electrode to grasp studs of a plurality of different sizes.

28. The method of claim 27 further comprising at least partially enclosing said electrode in a housing that is electrically insulated from said electrode.

29. The method of claim 28 wherein said housing defines a handle for manual manipulation of said method into position on said workpiece.

30. The method of claim 28 further comprising
coupling a switch between said source of high current electricity and said electrode for selectively delivering electricity to said electrode,
controlling said switch in response to actuation of a trigger.

31. The method of claim 27 wherein said electrode comprises a chuck comprising said plurality of sliding fingers.

32. The method of claim 31 wherein
said fingers have a threaded exterior surface, and further comprising
a chuck wheel having a threaded interior surface engagable to the threaded exterior surfaces of the fingers, for sliding the fingers in response to rotation of the chuck wheel.

33. The method of claim 32 wherein said chuck wheel has a circular threaded surface.

34. The method of claim 33 wherein said circular threaded surface of said chuck wheel is located at an outer periphery of said chuck wheel.

35. The method of claim 33 wherein said circular threaded surface of said chuck wheel is located at an interior surface of said chuck wheel.

36. The method of claim 33 further comprising providing a chuck drive motor having an output shaft and a pinion that rotates with the output shaft, said pinion being coupled to the threaded surface of said chuck wheel for driving said fingers to an open or closed position.

37. The method of claim 36 wherein said drive motor pinion is coupled directly to the threaded surface of the chuck wheel.

38. The method of claim 36 wherein said drive motor pinion is coupled indirectly to the threaded surface of the chuck wheel via one or more idler gears.

39. The method of claim 36 wherein an axis of rotation of said output shaft of said drive motor is parallel to an axis or rotation of said chuck wheel.

40. The method of claim 36 wherein an axis of rotation of said output shaft of said drive motor is orthogonal to an axis of rotation of said chuck wheel.

41. The method of claim 40 wherein at least one of said drive motor pinion and said chuck wheel comprise bevel gear teeth.

42. The method of claim 36 further comprising controlling said chuck drive motor to drive said fingers to an open or closed position.

43. The method of claim 42 further comprising detecting positioning of a stud at a proper location between said fingers, and in response controlling said chuck drive motor to drive said fingers to an open or closed position.

44. The method of claim 43 further comprising responding to completion of a weld process, to control said chuck drive motor to drive said fingers to an open position.

45. The method of claim 36 further comprising manual driving said fingers to an open position.

46. The method of claim 27 further comprising a vertical drive motor for lifting said electrode and a stud held therein as part of the welding operation.

47. The method of claim 46 wherein said vertical drive motor comprises a solenoid.

48. The method of claim 46 further comprising controlling said vertical drive motor to perform a lifting operation as part of stud welding.

49. The method of claim 48 further comprising initiating and controlling said vertical drive motor during a welding operation in response to actuation of a trigger and detection of an electrical connection between a stud in said electrode and said workpiece.

50. The method of claim 27 further comprising supporting and collating a strip assembly holding a plurality of studs to be engaged by said electrode.

51. The method of claim 50 wherein said strip assembly comprises two pieces of a collating strip.

52. A method of welding studs, comprising electrical connecting an electrode to a stud to be welded to a workpiece, said electrode having an adjustable aperture capable of grasping studs of a plurality of different sizes, providing supporting and collating strip assembly holding a plurality of studs to be engaged by said electrode, providing a drive assembly, said strip assembly being held by said drive assembly, and shifting each stud in said strip assembly, in sequence, to a position to be engaged by said electrode.

* * * * *

UNITED STATES PATENT AND TRADEMARK OFFICE
CERTIFICATE OF CORRECTION

PATENT NO. : 6,239,401 B1
DATED : May 29, 2001
INVENTOR(S) : McCardle et al.

It is certified that error appears in the above-identified patent and that said Letters Patent is hereby corrected as shown below:

Column 2,
Line 7, delete "is response", insert -- is responsive --.

Column 3,
Line 5, insert after "Fig. 14 is", insert -- a -- and
Line 20, delete "indicated at I", insert -- indicated at 1 --.

Column 4,
Line 35, after "arrow", insert -- 21 --;
Line 42, after "slide", insert -- in --; and,
Line 43, delete "between by single", insert -- by a single --.

Column 5,
Line 60, delete "chuck (as", insert -- chuck as --.

Column 6,
Line 26, delete "of winch", insert -- of which --.

Column 7,
Line 30, delete "resulting,", insert -- resulting --.
Line 33, delete "12.", insert -- 12, --.

Column 8,
Line 19, delete "worn gear", insert -- worm gear -- and
Line 63, after "illustrated", insert -- in --.

UNITED STATES PATENT AND TRADEMARK OFFICE
CERTIFICATE OF CORRECTION

PATENT NO.     : 6,239,401 B1
DATED          : May 29, 2001
INVENTOR(S)    : McCardle et al.

It is certified that error appears in the above-identified patent and that said Letters Patent is hereby corrected as shown below:

<u>Column 9,</u>
Line 31, delete "an are", insert -- an arc --.

Signed and Sealed this

Seventh Day of October, 2003

JAMES E. ROGAN
*Director of the United States Patent and Trademark Office*